(12) United States Patent
Duerr et al.

(10) Patent No.: US 6,438,982 B1
(45) Date of Patent: Aug. 27, 2002

(54) COOLING CONTAINER FOR VEHICLES

(75) Inventors: Bernhard Duerr, Calw-Stammheim; Frank Emhardt, Stuttgart; Ralf-Henning Schrom; Thomsa Geisel, both of Rottenburg; Rainer Tiefenbacher, Steinenbronn; Rainer Leucht, Baltmannsweiler; Hermann Gaus, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/912,489

(22) Filed: Jul. 26, 2001

(30) Foreign Application Priority Data

Jul. 26, 2000 (DE) .......................................... 100 36 266

(51) Int. Cl.$^7$ ................................................ B60H 1/32
(52) U.S. Cl. ......................... 62/244; 62/457.4; 220/480
(58) Field of Search ............................... 62/244, 457.3, 62/457.4; 220/480, 481

(56) References Cited

U.S. PATENT DOCUMENTS

| | | | |
|---|---|---|---|
| 3,916,639 A | * 11/1975 | Atkinson ..................... 165/41 |
| 4,236,749 A | * 12/1980 | Schluns ..................... 296/156 |
| 4,531,381 A | * 7/1985 | Toro et al. .................. 62/372 |
| 4,580,412 A | * 4/1986 | Wells .......................... 62/372 |
| 4,823,554 A | * 4/1989 | Trachtenberg et al. ........ 62/239 |
| 5,203,833 A | * 4/1993 | Howell ........................ 165/41 |
| 6,282,906 B1 | * 9/2001 | Cauchy ....................... 62/244 |

FOREIGN PATENT DOCUMENTS

DE      296 05 954      9/1996

* cited by examiner

*Primary Examiner*—William E. Tapolcai
(74) *Attorney, Agent, or Firm*—Crowell & Moring LLP

(57) ABSTRACT

A cooling container for vehicles arranged in use laterally next to a seat cushion of a vehicle seat. The cooling container has a cooling compartment accessible from the top through a container opening after a lid is opened, the cooling compartment being sufficient at least for accommodating one commercially available drinks bottle stored lengthways in it, and being of a depth which clearly exceeds the bottle diameter. The cooling compartment is sufficient at least for accommodating a commercially available drinks bottle stored lengthways in it, but is of a depth which is too small to accommodate an upright drinks bottle below the closed lid. Retaining structure is arranged in the cooling compartment of the cooling container in order to secure the drinks bottle below the closed lid in a ready-to-hand storage position in which the drinks bottle extends obliquely upwards with its bottle neck towards an end region of the cooling compartment, which end region is arranged so that the bottle can be readily grasped. A lid arrangement is provided as the lid of the cooling container, the said lid arrangement being used in a closed position also to at least substantially cover the drinks bottle which protrudes upwards out of the container opening.

20 Claims, 5 Drawing Sheets

COOLING CONTAINER FOR VEHICLES

BACKGROUND AND SUMMARY OF THE INVENTION

This application claims the priority of 100 36 266.4, filed in Germany, Jul. 26, 2000, the disclosure of which is expressly incorporated by reference herein.

The invention relates to a cooling container for vehicles. Preferred embodiments relate to a Cooling container for vehicles, which in use is arranged laterally next to a seat cushion of a vehicle seat and whose cooling compartment is accessible from the top through a container opening after a lid is opened, the cooling compartment being sufficient at least for accommodating one commercially available drinks bottle stored lengthways in it, and being of a depth which clearly exceeds the bottle diameter.

Preferred embodiments of the invention also relate to a cooling container for vehicles whose cooling compartment is accessible from the top through a container opening after a lid is opened, the cooling compartment being sufficient at least for accommodating one commercially available drinks bottle which is stored lengthways in it, but being of a depth which is too small to accommodate the upright drinks bottle below the closed lid.

German Patent Document DE 296 05 954 U1 discloses a cooling container of this type for vehicles, the cooling chamber of which is accessible from the top after a lid is opened. For a space-saving arrangement of the cooling container in the vehicle, the cooling container is preferably situated next to a vehicle seat, so that in principle it can be reached comfortably by the passenger. In this case, provision is made to arrange the cooling container as a central armrest, in which case the upper side of the lid forms the supporting surface of the armrest. The height of the cooling chamber in the container is dimensioned in such a manner that commercially available drinks bottles can be transported horizontally therein with the lid closed.

However, the accessibility to the drinks bottle in the cooling chamber can be made considerably more difficult if yet further objects which are to be cooled are stored above the stored bottle. In addition, drinks bottles which exceed the length of the cooling chamber cannot readily be transported in the known cooling container. The same is true of drinks bottles which, after opening, can be re-closed only inadequately, if at all, for example uncorked champagne or wine bottles, and may consequently leak when transported horizontally.

An object of the invention is to develop a cooling container of the generic type for vehicles yet retaining compact dimensions to the effect that the cooling container is also suitable for transporting relatively long, commercially available drinks bottles without any loss in the convenience of use.

This object is achieved according to certain preferred embodiments of the invention by providing a cooling container for vehicles, which in use is arranged laterally next to a seat cushion of a vehicle seat and whose cooling compartment is accessible from the top through a container opening after a lid is opened, the cooling compartment being sufficient at least for accommodating one commercially available drinks bottle stored lengthways in it, and being of a depth which clearly exceeds the bottle diameter, wherein retaining means are arranged in the cooling compartment of the cooling container in order to secure the drinks bottle below a closed lid in a ready-to-hand storage position in which the drinks bottle extends obliquely upwards with its bottle neck toward an end region of the cooling compartment, which end region is arranged so that the bottle can be readily grasped.

This object is also achieved according to certain preferred embodiments of the invention by providing a cooling container for vehicles whose cooling compartment is accessible from the top through a container opening after a lid is opened, the cooling compartment being sufficient at least for accommodating one commercially available drinks bottle which is stored lengthways in it, but being of a depth which is too small to accommodate the upright drinks bottle below the closed lid, wherein a lid arrangement is provided as the lid of the cooling container, the lid arrangement being used in a closed position also to at least substantially cover the drinks bottle which protrudes upwards out of the container opening.

Further advantageous features of preferred embodiments of the invention are described herein and in the claims.

A drinks bottle is fixed in an approximately diagonal position in the cooling chamber by corresponding retaining means in such a manner that the bottle neck is proffered to the passenger in a position which is raised and is therefore particularly readily grasped. In this case, the diagonal arrangement means that the drinks bottle merely requires a cooling chamber which may be shorter than the bottle itself. In addition, the bottle neck which is arranged so that it is readily grasped remains more easily accessible, when the cooling chamber is loaded with additional items, than when the drinks bottle is in a horizontal position. The convenience in use is also increased by the fact that the opened drinks bottle can be transported upright in the cooling chamber while the cooling is maintained, in which case the problem-free accessibility is likewise ensured.

By designing the subject matter of the application in accordance with the features described herein, a combination is created through which the objects of the invention are achieved in a particularly advantageous manner.

In order to be able to axially secure drinks bottles of differing lengths in the cooling container, the retaining means provided for the bottle bottom are preferably spring elements which press the drinks bottle against the corresponding retaining means on the bottle neck.

If the retaining means provided on the bottle neck is designed as a forked support, the bottle neck can be secured against slipping in a simple manner on a projection which is preferably arranged on an end wall in the end region of the cooling container where the bottle can be readily grasped.

By means of the lid arrangement, which preferably comprises a sliding lid and a covering hood, the cooling container can be closed to the greatest possible extent in virtually any desired transporting position of the drinks bottle, so that the bottle contents remain cooled. The sliding lid can virtually completely be displaced from the covering region of the container opening in the direction of the end region of the cooling container, which end region is positioned so that the bottle cannot be readily grasped.

In order to maintain the cooling without excessive heat losses even when the drinks bottle is upright, the covering hood has a passage opening which can be widened or narrowed elastically and through which the drinks bottle can be put from above into the cooling container or removed therefrom. When the drinks bottle is upright, that region of the covering hood which bounds the passage opening fits closely against the bottle neck, so that the container opening remains closed to the greatest possible extent.

The trapezoidal geometry of the cooling container according to certain preferred embodiments enables the drinks bottle to be fixed diagonally in a simple manner, since the bottle bottom is supported against the rear end wall which is arranged inclined. In its upright position, the drinks bottle is supported against the front end wall, so that it is held to be substantially secure against tilting.

Other objects, advantages and novel features of the present invention will become apparent from the following detailed description of the invention when considered in conjunction with the accompanying drawings.

DETAILED DESCRIPTION OF THE DRAWINGS

Figure 1:
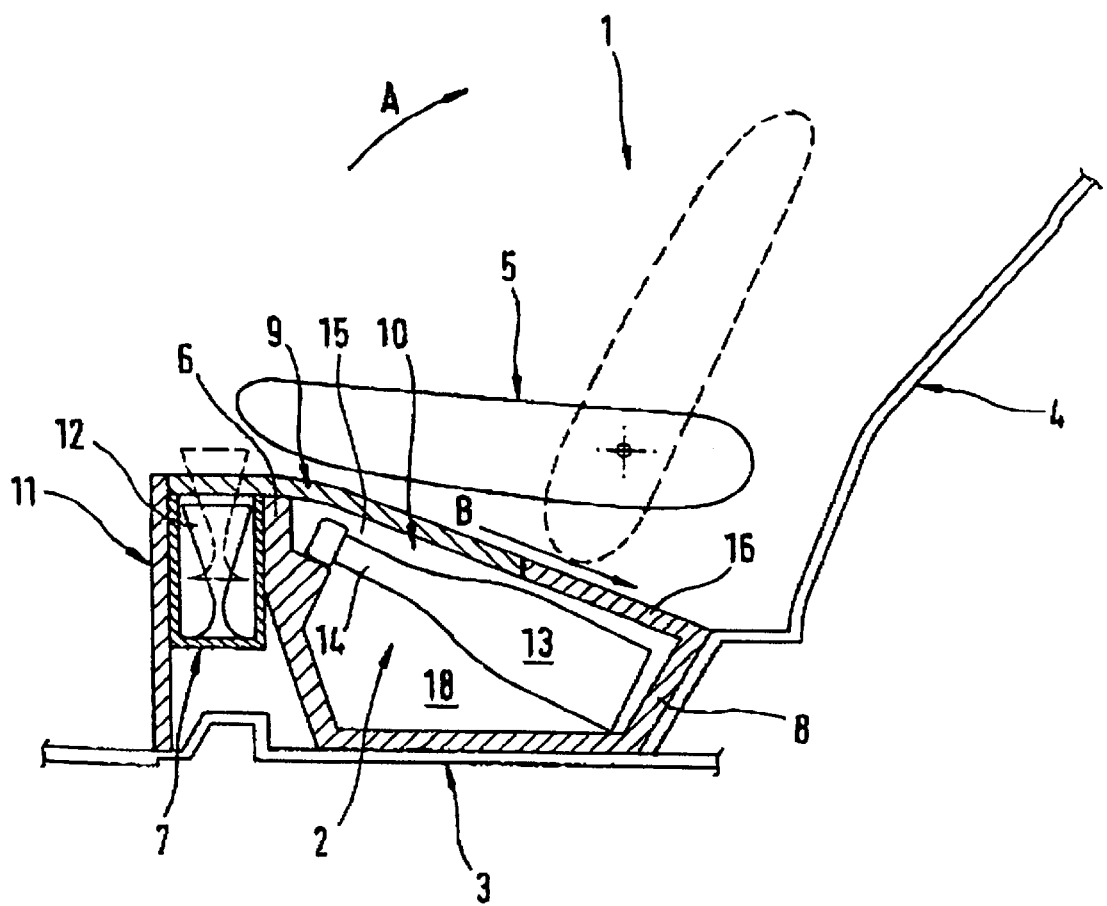
FIG. 1 shows an arrangement of a cooling container in a rear seat bench in an illustration in longitudinal section, constructed according to a preferred embodiment of the present invention.

FIG. 1 illustrates schematically a rear seat bench 1 which is arranged facing in the direction of travel and has an integrated cooling container 2 in a longitudinal section along the longitudinal central plane of a motor vehicle (not illustrated).

For reasons of clarity, the rear seat bench 1 is indicated merely by a floor plate 3 which supports the cooling container 2, a partition 4 arranged at an inclination and by a pivotably mounted armrest 5.

The cooling container 2 has a trapezoidal longitudinal section, a further, upwardly open container 7 being fastened to its front end wall 6. The cooling container 2 bears with its rear end wall 8 against the partition 4. A lid arrangement 9 closes both an upwardly facing container opening 10 of the cooling container 2 and the upwardly open container 7, the lid arrangement 9 being adjacent in its closed position to a closing wall 11 fastened to the container 7.

For opening the cooling container 2, it is first of all necessary to swing the armrest 5 upwards according to the arrow direction A into the position illustrated by dashed lines. The lid arrangement 9 can then be displaced from covering the container 7 and the container opening 10 to the rear in the arrow direction B. If drinking vessels 12 are resiliently stored in the container 7, the said drinking vessels are raised, when the lid arrangement 9 is opened, into the position illustrated by dashed lines, so that they can readily be grasped by the passenger. A drinks bottle 13 which is stored diagonally in the cooling container 2 and extends with its bottle neck 14 into an end region 15 of the cooling container 2, which end region is arranged so that the bottle can be readily grasped and is disposed in the vicinity of the seat-cushion front edge so that the end region can likewise be reached comfortably.

That region of the cooling container 2 which; due to the lower region of the armrest 5, is positioned so that the bottle cannot be readily grasped is covered by a plate 16 fastened to the upper side of the cooling container 2.

Figure 2:
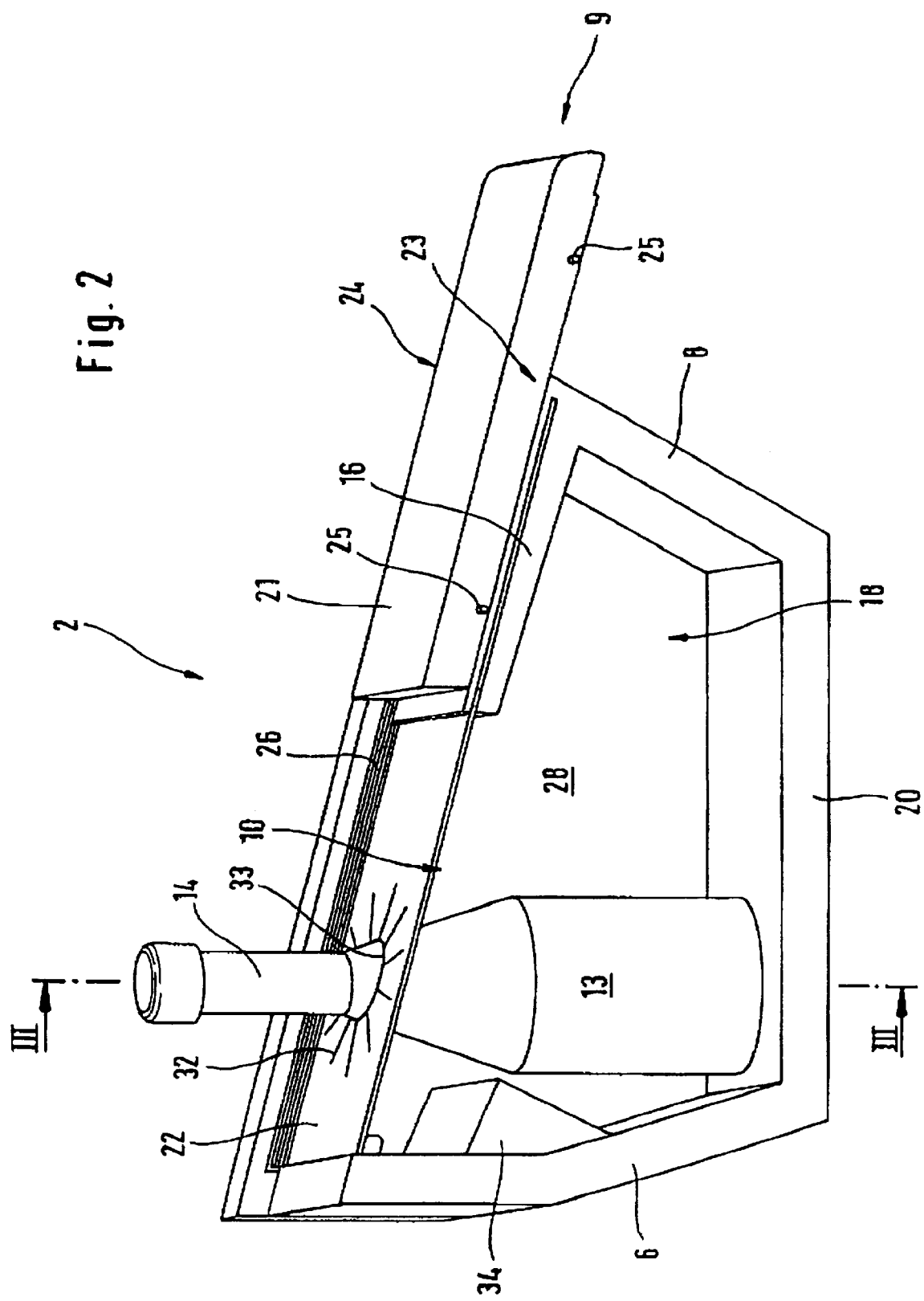
FIG. 2 shows an individual illustration of the cooling container according to FIG. 1 with an upright drinks bottle.

In order to explain the structure and the functioning of the cooling container 2, the latter is illustrated perspectively in FIG. 2 in a view from the side without a side wall.

In addition to its end walls 6 and 8 which have already been mentioned in the description for FIG. 1, the cooling container 2 has a baseplate 20 from which the two end walls 6 and 8 extend obliquely upwards. The end walls 6 and 8 which differ in height produce the inclined arrangement of the container opening 10 which is partially covered by the plate 16 fastened to the end wall 8. All of the container walls forming a cooling chamber 18 are preferably of heat-insulated design to give good insulation of the cooling container 2.

The lid arrangement 9 is fastened displaceably on the container opening 10. In this case, the lid arrangement 9 comprises a sliding lid 21 and a covering 22.

Figure 3:
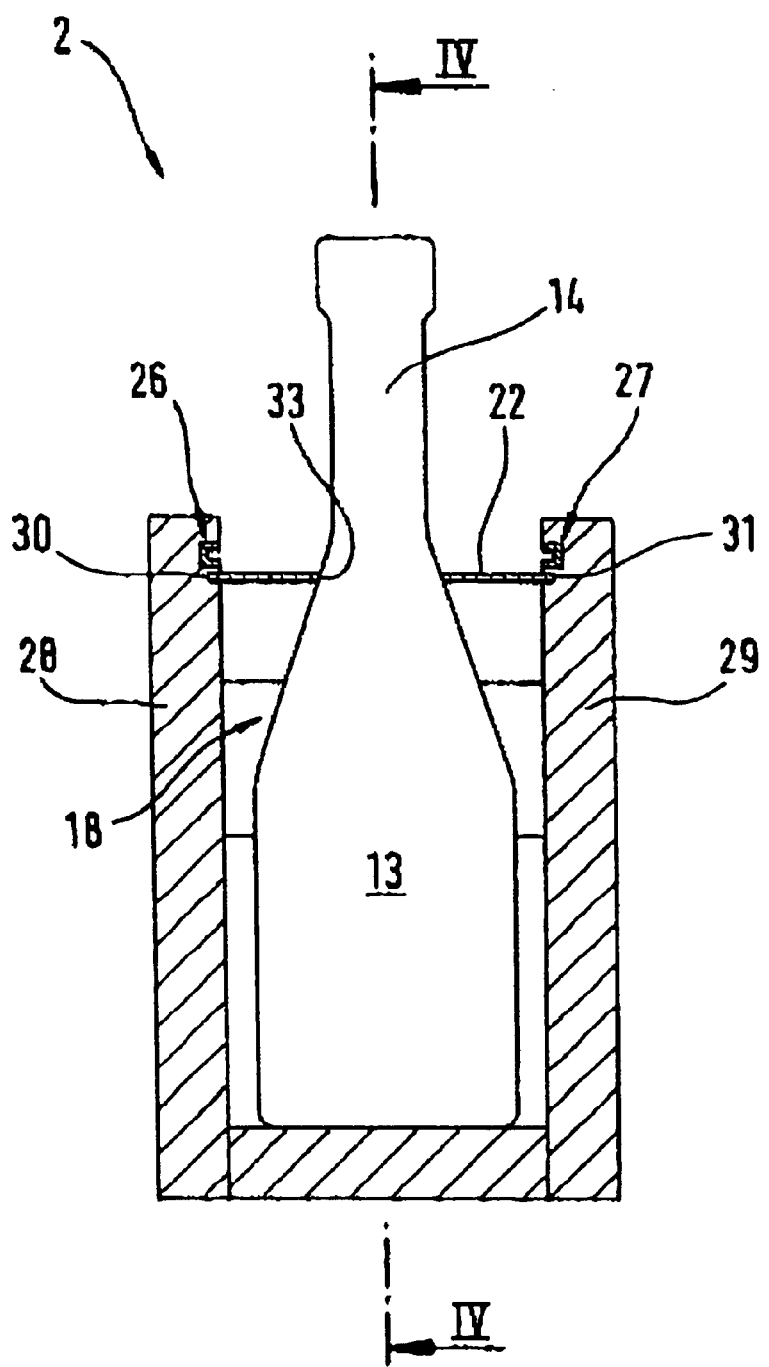
FIG. 3 shows a sectional illustration according to the line III—III in FIG. 2.

The sliding lid 21 has, on its two longitudinal sides 23 and 24, guide bolts 25 which, as can be seen in particular from FIG. 3, are guided in guide rails 26 and 27. The guide rails 26 and 27 are embedded on the insides of the side walls 28 and 29.

The covering 22 is likewise guided in a sliding manner and can be displaced in guides 30 and 31 according to the arrow direction B virtually completely into a receiving shaft/slot provided for it in the plate 16. The covering 22 is made of elastic material, so that a passage opening 33, which is provided with incisions 32 arranged in a radiant manner, fits snugly against the bottle neck 14 of the bottle 13 which is now mounted upright. If the need arises, the passenger can transport a very large or already opened bottle upright and can remove it from the cooling container and put it back in from above in a comfortable manner without the cooling in the container being substantially impaired.

Figure 4:
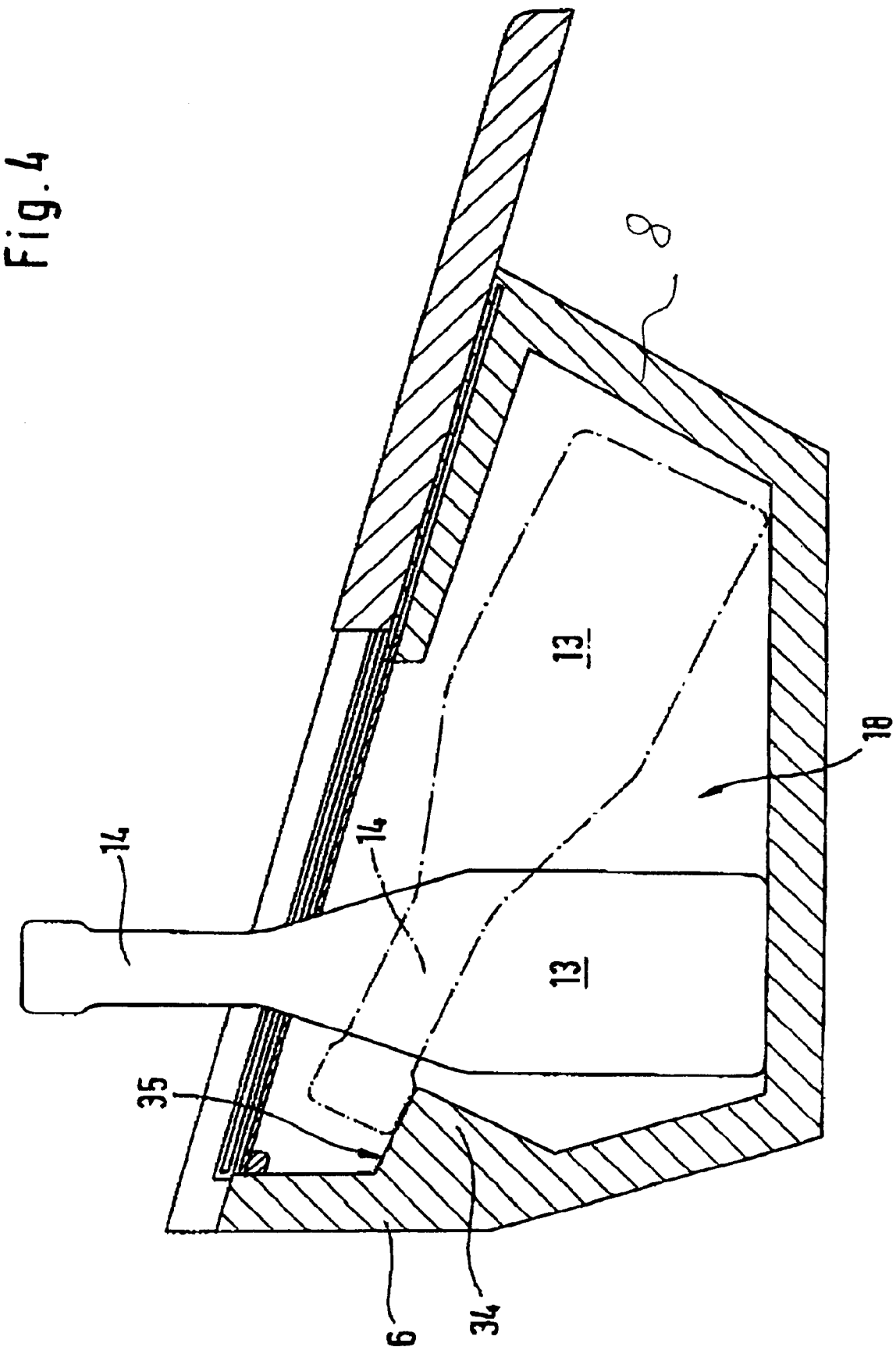
FIG. 4 shows a sectional illustration according to the line IV—IV in FIG. 3 with a drinks bottle mounted diagonally and upright.

In the sectional illustration in FIG. 4, the drinks bottle 13, which is illustrated by solid lines, is mounted upright as in FIGS. 2 and 3. The drinks bottle 13 which is illustrated by dash-dotted lines is stored in a diagonal position in the cooling container 2. A projection 34 which extends in a stepped manner into the cooling chamber is provided for this purpose on the inside of the end wall 6.

The upper edge 35 runs approximately at right angles to the rear end wall 8, so that the bottle bottom is supported on the rear end wall 8, while the bottle head rests on the projection 34. If the sliding lid 21 is now opened, the bottle neck 14 is proffered to the passenger in a manner so that it is readily grasped. At the same time, further foodstuffs may be stored in the cooling chamber without impairing the readily grasped arrangement.

Figure 5:
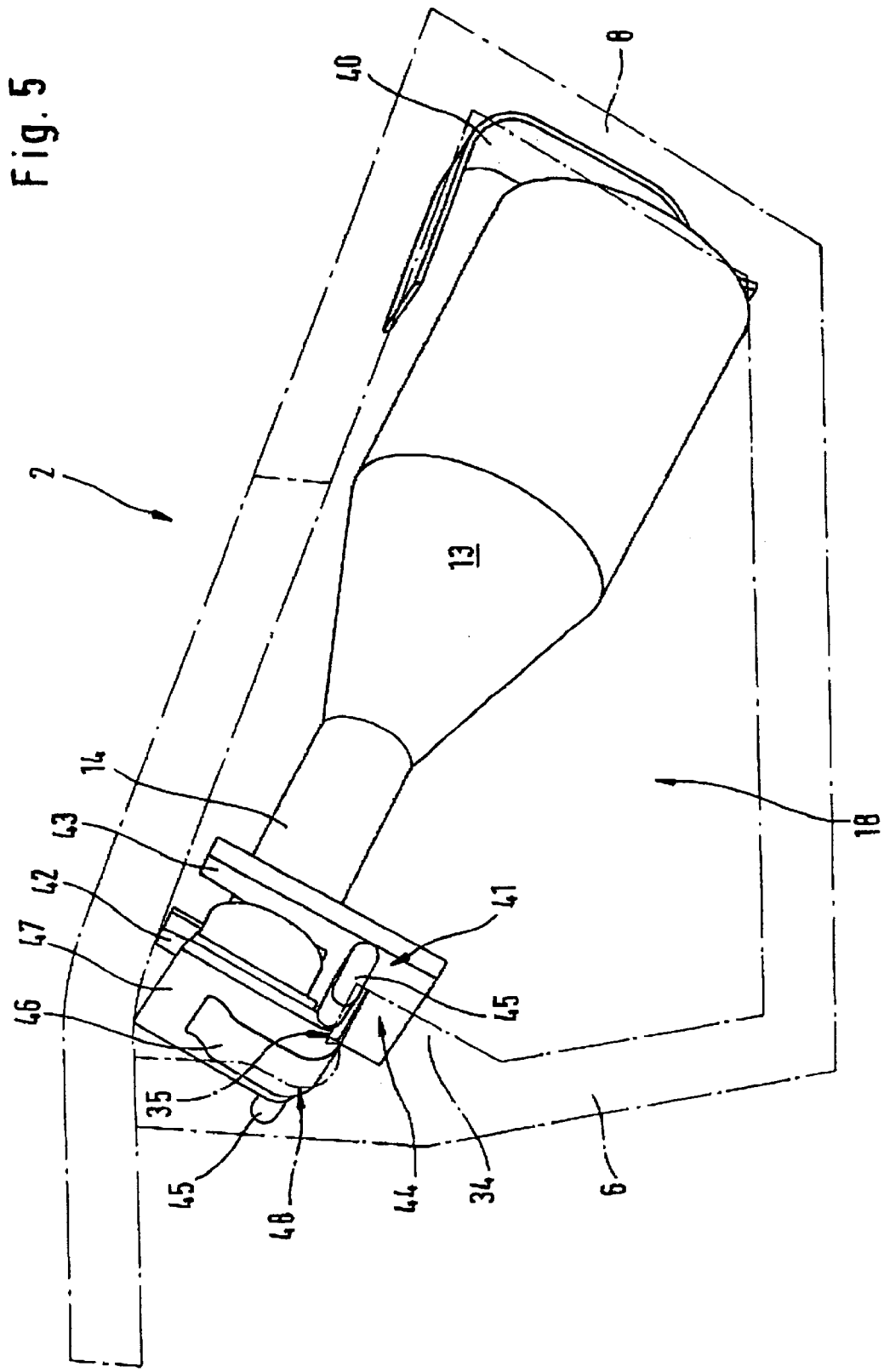
FIG. 5 shows a perspective illustration of the diagonally mounted drinks bottle together with a leaf spring and a forked support in a cooling container for vehicles constructed according to certain preferred embodiments of the invention.

Features of preferred embodiments of the invention are illustrated in FIG. 5 where the cooling container 2 is indicated merely by contours. Similar reference characters are used in FIG. 5 for similar features described above with respect to FIGS. 1–4.

Resilient retaining means are provided as a means of securing during transportation and for drinks bottles of different sizes whose capacity may preferably be from 0.3 l (liter) to 1 l (liter) and which therefore have extremely varied dimensions. The bottle bottom is supported on the end wall 8 via a leaf spring 40. The bottle neck 14 is held by a forked support 41 which rests on the upper side 35 of the projection 34.

The forked support 41 has two forks 42 and 43 which are connected to each other by a carrier 44. A bracket 45, on which a bottle stopper 47 which is acted upon by a spring 46 is pivotably mounted, is fastened to the carrier 44 transversely thereto. The forked support 41 is additionally supported by a depression 48 in the front end wall 6, which depression is matched to the bent shape of the spring 46. The forked support 41 therefore not only protects the drinks bottle 13 from slipping on the projection 34, but also protects against leakage from drinks bottles which have already been opened and can be difficult to re-close, for example champagne or wine bottles.

By means of the contact pressure of the leaf spring 40, the forked support 41 rests securely together with the drinks bottle 13 on the projection 34. Forked supports of different sizes can be provided for different bottle-neck diameters.

In the case of the cooling container described, the clear width of the cooling chamber is matched to the diameter of a commercially available 1 l (liter) champagne bottle. However, depending on requirements, the geometry of the cooling chamber can also be designed for other drinks bottles. Bottles which have different dimensions or unusual shapes can also be fixed in place in a simple manner by the corresponding retaining means.

If the space conditions permit, a cooling container could be designed for transporting a number of champagne bottles arranged next to one another in the cooling chamber, in which case all of the champagne bottles can be held in the same position in a manner so that they are readily grasped. A cooling container of this type could have two of the described lid arrangements or else an appropriately wider lid arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Cooling container for vehicles, which in use is arranged laterally next to a seat cushion of a vehicle seat and whose cooling compartment is accessible from the top through a container opening after a lid is opened, the cooling compartment being sufficient at least for accommodating one commercially available drinks bottle stored lengthways in it, and being of a depth which clearly exceeds the bottle diameter, wherein retaining means are arranged in the cooling compartment of the cooling container in order to secure the drinks bottle below a closed lid in a ready-to-hand storage position in which the drinks bottle extends obliquely upwards with its bottle neck toward an end region of the cooling compartment, which end region is arranged so that the bottle can be readily grasped.

2. Cooling container according to claim 1, wherein the retaining means extend approximately at right angles to the central longitudinal axis of the drinks bottle in the ready-to-hand storage position, a respective retaining means being provided for the bottle bottom and for the bottle neck of the drinks bottle.

3. Cooling container according to claim 2, wherein the retaining means for the bottle bottom includes a spring element which is supported on an end wall of the cooling container, which end wall runs transversely with respect to a central longitudinal axis of a stored drinks bottle.

4. Cooling container according to claim 3, wherein a bent leaf spring is provided as the spring element acting axially on the drinks bottle.

5. Cooling container according to claim 4, wherein the retaining means for the bottle neck of the drinks bottle is a forked support which grips around the bottle neck and, with the drinks bottle held in the storage position, is supported behind a projection running transversely with respect to the central longitudinal axis of the drinks bottle in an end region of the cooling container, which end region is arranged so that the bottle can be readily grasped.

6. Cooling container according to claim 5, wherein the forked support contains a bottle stopper and can be removed out of the cooling container together with the drinks bottle.

7. Cooling container according to one of claim 1, wherein the cooling container comprises a fourcornered base surface and two substantially trapezoidal side walls which are connected to each other by two end walls arranged inclined with respect to the base surface.

8. Cooling container according to claim 7, wherein the cooling container is arranged below an armrest which can be swung up, and in its end region, which is placed so that the bottle cannot be readily grasped, is closed to form a box by a plate adjacent to the container opening.

9. Cooling container according to either of claim 1, wherein a storage container for drinking vessels, which container is accessible from the top after the lid is opened, is also covered by the closed lid for the container opening.

10. Cooling container for vehicles whose cooling compartment is accessible from the top through a container opening after a lid is opened, the cooling compartment being sufficient at least for accommodating one commercially available drinks bottle which is stored lengthways in it, but being of a depth which is too small to accommodate the upright drinks bottle below the closed lid, wherein a lid arrangement is provided as the lid of the cooling container, the lid arrangement being used in a closed position also to at least substantially cover the drinks bottle which protrudes upwards out of the container opening, wherein the container opening of the cooling container is covered in a closed position by a covering hood for that region of the container opening which is penetrated by the bottle neck, and wherein the covering hood consists of flexurally elastic material and has a passage opening for the upwardly protruding bottle neck of the upright drinks bottle.

11. Cooling container according to claim 10, wherein the passage opening in the covering hood can be widened or narrowed elastically over a diametric range.

12. Cooling container assembly for vehicles, comprising:

a cooling compartment configured to accommodate a commercially available drinks bottle stored lengthwise in the compartment, said compartment having a vertical depth substantially greater than a bottle diameter, a lid selectively closing an upwardly facing opening facilitating passenger access to a drink bottle in said cooling compartment, and at least one elastically biased member engageable in use with a bottle to hold the bottle in an inclined stowage position in the cooling compartment when said lid is closed.

13. Cooling container assembly according to claim 12, wherein said cooling compartment includes a bottom well, a rear wall and a front wall, said front wall including a front wall abutment surface operable to abuttingly support an upper portion of a bottle in the stowage position, said rear wall including a rear wall support surface supportingly engageable with the bottom end of a bottle in the stowage position.

14. Cooling container assembly according to claim 13, wherein said at least one elastically biased member includes a rear biased spring disposed at the rear wall support surface to engage a bottle in said stowage position and elastically press the bottle toward the front and bottom wall.

15. Cooling container assembly according to claim 14, wherein said at least one elastically biased member includes a spring clamp at said front wall operable to clamp an upper end of a bottle in said stowage position.

16. Cooling container assembly according to claim 13, wherein the front wall abutment surface is perpendicular to the rear wall support surface.

17. Cooling container assembly according to claim 15, wherein the front wall abutment surface is perpendicular to the rear wall support surface.

18. Cooling container assembly according to claim 12, comprising a covering disposed under the lid and operable to cover said compartment with a vertically extending bottle protruding through the covering.

19. Cooling container assembly according to claim 18, wherein said covering is selectively movable between an open position and a covering position.

20. Cooling container assembly according to claim 12, wherein said cooling compartment is configured to accommodate a drinks bottle between 03 and 1.0 liter in size.

* * * * *